United States Patent

Assmundson

[11] Patent Number: 5,857,816
[45] Date of Patent: Jan. 12, 1999

[54] TORQUE-LIMITING FASTENING DEVICE

[75] Inventor: Jarl Assmundson, Hovås, Sweden

[73] Assignees: Anglo Dutch International Finance N.V.; Maduro & Curiel's Trust Company N.V., both of Curacao, Netherlands Antilles

[21] Appl. No.: 817,344

[22] PCT Filed: Oct. 16, 1995

[86] PCT No.: PCT/SE95/01204

§ 371 Date: Jun. 30, 1997

§ 102(e) Date: Jun. 30, 1997

[87] PCT Pub. No.: WO96/12114

PCT Pub. Date: Apr. 25, 1996

[30] Foreign Application Priority Data

Oct. 17, 1994 [SE] Sweden ................................. 9403529

[51] Int. Cl.⁶ .................................................. F16B 31/00
[52] U.S. Cl. .................... 411/1; 411/5; 411/396
[58] Field of Search .................... 411/1–6, 8, 14, 411/396, 397; 81/467, 471

[56] References Cited

U.S. PATENT DOCUMENTS

| 869,086 | 10/1907 | Hoffman | 411/393 |
|---|---|---|---|
| 1,082,945 | 12/1913 | Grahm | 411/393 |
| 2,544,522 | 3/1951 | Bertelsen | 81/471 |
| 3,237,507 | 3/1966 | Modrey . | |
| 3,667,339 | 6/1972 | Dame . | |
| 3,841,177 | 10/1974 | Watterback . | |
| 4,046,052 | 9/1977 | Nordstrom . | |
| 4,627,774 | 12/1986 | Bradley . | |
| 5,176,050 | 1/1993 | Sauer | 81/467 |
| 5,584,626 | 12/1996 | Assmundson | 411/8 |
| 5,681,135 | 10/1997 | Simonson | 411/5 |

FOREIGN PATENT DOCUMENTS

| 365589 | 3/1974 | Sweden | F16B 31/02 |
|---|---|---|---|
| 1444276 | 7/1976 | United Kingdom . | |
| WO 94/02749 | 2/1994 | WIPO | F16B 31/02 |

*Primary Examiner*—Flemming Saether
*Attorney, Agent, or Firm*—Michael D. Bednarek; Kilpatrick Stockton LLP

[57] ABSTRACT

The invention relates to a fastening element with a torque-limiting function, comprising on the one hand a fastening member (2, 2') with working threads (4), that is to say threads which are active for the fastening function of the element, and on the other hand a gripping member (3, 3') which is arranged so as to be capable of being turned with the aid of a spanner, wrench, screwdriver or other tool for attaching the fastening element (1, 1') and connected or connectable to the fastening member (2, 2') via torque-transmitting threaded connection (5, 6/17, 18) with sufficient strength in order to be capable of transmitting to the fastening member torque of the size for which the fastening element is intended, and in which the gripping member is arranged to be unscrewed and turned relative to the fastening member, on attachment of the fastening element, only when the torque exceeds a given predetermined torque. The threads (5, 6/17, 18) in the torque-transmitting threaded connection are threaded in the opposite direction compound with the working threads (4).

20 Claims, 2 Drawing Sheets

TORQUE-LIMITING FASTENING DEVICE

TECHNICAL FIELD

The invention relates to a fastening element with a torque-limiting function, comprising on the one hand a fastening member with working threads, that is to say threads which are active for the fastening function of the element, and on the other hand a gripping member which is arranged so as to be capable of being turned with the aid of a spanner, wrench, screwdriver or other tool for attaching the fastening element and connected or connectable to the fastening member via a torque-transmitting threaded connection with sufficient strength in order to be capable of transmitting to the fastening member torque of the size for which the fastening element is intended, and in which the gripping member is arranged to be unscrewed and turned relative to the fastening member, on attachment of the fastening element, only when the torque exceeds a given predetermined torque.

STATE OF THE ART

Fastening elements of the type indicated above are known from e.g. SE 365589 and SE 467797.

BRIEF DESCRIPTION OF THE INVENTION

The aim of the invention is to make available a fastening element which is improved in relation to known technology. More precisely, the invention aims to make available a fastening element which has at least one of the following improvements in relation to known technology:

- possibility of forming a stop on the fastening member with a large stop surface in relation to the cross-section of the fastening member,
- possibility of forming a gripping member with a gripping width which is relatively small in relation to the cross-sectional dimensions of the fastening member and/or
- offering a construction which is advantageous from the manufacturing point of view.

At least on of these and other aims can be achieved with a fastening element which is characterized by what is indicated in the following patent claims. Further characteristics and aspects of the invention emerge from the following description of preferred embodiments.

SHORT DESCRIPTION OF THE FIGURES

In the following description of preferred embodiments, reference will be made to the attached drawing figures, in which FIG. 1 represents a side view of a torque screw together with a gripping member according to a first preferred embodiment of the invention, FIG. 2 shows a modified embodiment of the fastening element according to FIG. 1, FIG. 3 shows a side view, partly in section, of a fastening element according to a second preferred embodiment of the invention, FIG. 4 represents an end view IV—IV in FIG. 3, FIG. 5 shows a side view, partly in section, of a third preferred embodiment of the invention, where the gripping member and the fastening member are two separatable elements, and

FIG. 6 and

FIG. 6A show a variant of the device according to FIG. 5.

DESCRIPTION OF PREFERRED EMBODIMENTS

Figure 1:
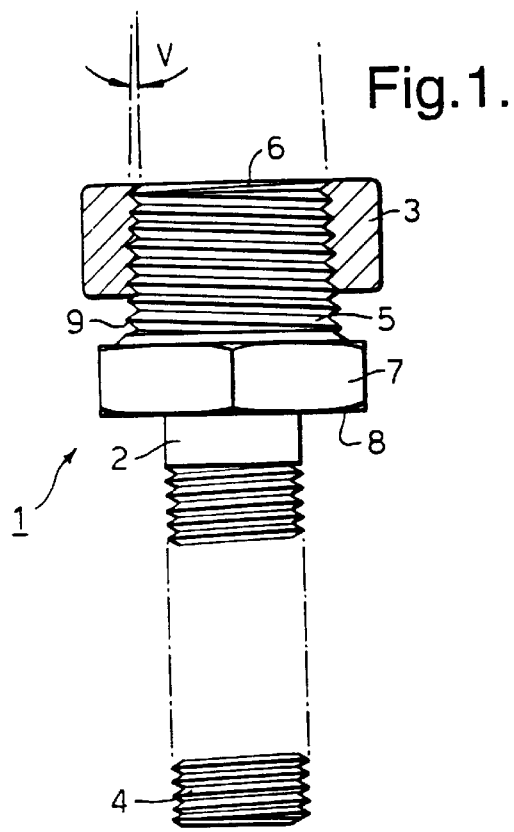

With reference first to FIG. 1, a fastening element is designated generally with the number 1. It consists of a fastening member in the form of a fastening screw 2 and a gripping member in the form of a torque nut 3. At one end, the fastening screw 2 has normally right-hand threaded working threads 4, i.e. threads which are active for the fastening of the element, and at the other end is a screw head 9. On the screw head 9 there are torque-transmitting outer threads 5 which are left-hand threaded and in the torque nut 3 there are corresponding torque-transmitting left-hand threaded threads 6. Between the region of the working threads 4 and the screw head 9 there is a flange 7 designed as a hexagonal gripping piece. At the same time, the gripping piece 7 functions as a stop and has on its underside a relatively large stop surface 8 intended to be pressed against the object which is to be fastened with the aid of the fastening element.

The screw head 9 is conical like the inside of the torque nut 3 and consequently also the threads 5, 6. The conicity is such that the imaginary point of the cone faces in the direction away form the working threads 4. The angle of inclination has been designated v.

The fastening element 1 thus described functions in the following manner. The torque nut 3 has at the manufacturer's been screwed firmly on the screw head 9, so hard that a given defined torque is required in order to be capable of unscrewing the torque nut 3 from the fastening screw 2. In use, the fastening element 1 functions initially as an integrated screw which is screwed firmly by means of the working threads 4 into a nut member (not shown), e.g. in order to fasten an object against the stop surface 8. The screwing is carried out with the aid of an adjustable spanner, fixed spanner, spanner, pipe wrench, multifix wrench or the like, which grips around the torque nut 3. When the fastening screw 2 has "bottomed" with the stop surface 8 against the object (not shown), the fastening element 1 is turned further until the predetermined torque is reached and exceeded, whereupon the torque nut 3 comes off the screw head 9. Because the threads 5,6 of the torque nut 3 and of the screw head 9 are left-hand threaded, the torque nut 3, on continued turning, still move upwards, i.e. away from the working threads 4 of the fastening screw 2.

When the fastening screw 2 is to be unscrewed, the stop 7 is used as gripping piece for an adjustable spanner, fixed spanner or similar tool.

Figure 2:
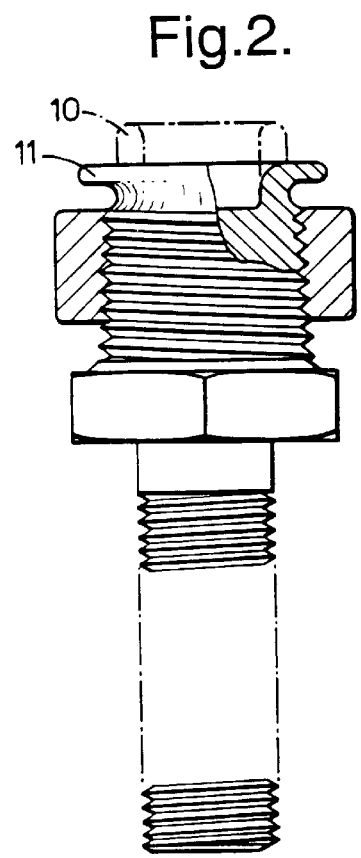

The embodiment according to FIG. 2 differs from the preceding only in that the fastening screw 2 has been provided with an axial sleeve, shaped extension 10 which has then been upset outwards so that a collar 11 is formed which prevents the torque nut 3 leaving the fastening element when the torque nut 3 has been unscrewed.

Figure 3:
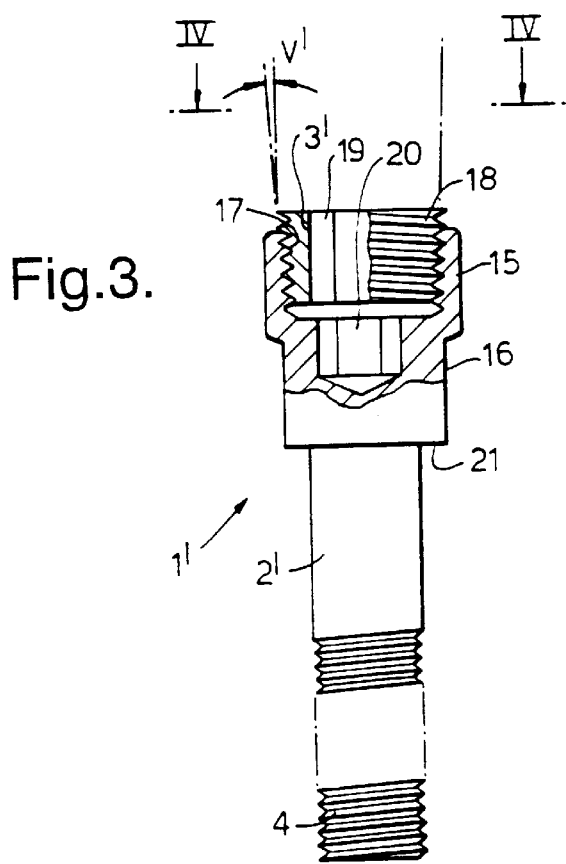
Figure 4:
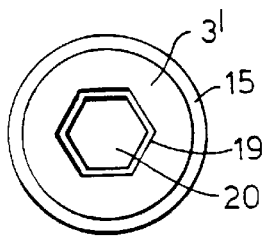

FIG. 3 illustrates an embodiment of a fastening element 1' with a fastening member in the form of a fastening screw 2' which at its one end is provided with conventional, right-hand threaded working threads 4. At the other end is a screw head 15 and a screw neck 16. In the screw head 15 are inner torque-transmitting, left-hand threaded threads 17 which interact with torque-transmitting outer, left-hand threaded threads on a torque screw 3'. The torque screw has a first hexagon socket 19 for a hexagon socket spanner for manoeuvring the integrated fastening element 1'.

In order to unscrew the fastening screw 2', there is in the screw neck 16 a second hexagon socket 20 which is coaxial with the first hexagon socket 19 in the screw head 15 so that a smaller hexagon socket spanner can be passed through the screw head 15 into the hexagon socket 20 in the screw neck 16. The screw neck 16 also functions as a stop and has on its underside a stop surface 21 facing the working threads 4 which can be pressed against an object on attachment of the fastening element 1'.

The torque screw 3' and its outer left-hand threaded threads 18 are conical like the internal shape of the corresponding nut member in the screw head 15 with its inner left-hand threaded threads 17. The angle of inclination of the cone has been designated v'.

The conicity is furthermore such that the imaginary point of the cone faces in the direction towards the working threads 4 of the fastening screw 2'.

The fastening element 1' is handled and functions in a manner which is similar to that which has been described in connection with the embodiment according to FIG. 1. The torque screw 3' has at the manufacturer's been screwed firmly in the screw head 15 with such great force that a given defined torque is required to unscrew the torque screw 3' from its engagement with the screw head 15. The integrated fastening element 1' is screwed firmly by means of the working threads 4, in which connection use is made of a hexagon socket spanner which is arranged in the first hexagon socket 19 in the screw head 15. It will be understood that the fastening element 1' is suited for being capable of being arranged in, and in its totality for being capable of being countersunk in, a borehole. When the fastening element 1' has been screwed firmly so far that the stop/the screw neck 16 has bottomed, i.e. that the stop surface 21 has been brought to bear against a bearing surface, the fastening element 1' is tightened further with the aid of the hexagon socket spanner in the hexagon socket 19 until the predetermined torque is reached and exceeded. With this, the torque screw 3' is unscrewed from its engagement with the left-hand threaded inner threads 17 in the screw head 15. On continued turning, the torque screw 3' moves upwards, i.e. away from the working threads 4, after which no further torque can be transmitted to the fastening screw 2'.

When the fastening screw 2' is to be unscrewed, a smaller hexagon socket spanner is introduced into the inner hexagon socket 20 in the screw neck 16 and is turned.

Figure 5:
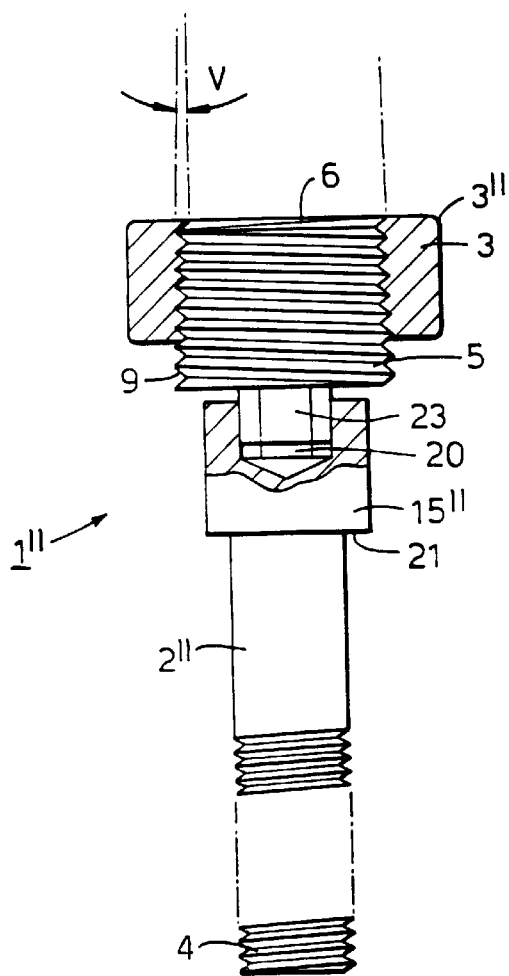

In FIG. 5 an integrated fastening element is designated 1". It consists of a standard type fastening screw 2" with a hexagon socket 20 and a torque member 3". The standard type fastening screw 2" in one end thereof has conventional, right-hand threaded working threads 4 and in its opposite end a screw head 15" accommodating said hexagon socket 20. The underside of the screw head in a conventional manner has a stop surface 21, which can be pressed against an object at the tightening of the fastening device 1".

The torque member 3" is a separate unit, which initially preferably is united with the fastening screw 2" by a hexagon pin 23 forming an extension of a left-hand threaded torque screw 9 having threads 6. A torque nut cooperating with torque screw 9 is designated 3. Its interior, left-hand threaded threads are designated 6. The torque screw 9 is conical as well as the inside of the torque nut 3 and hence also the threads 5,6. The conicity is furthermore such that the imaginary point of the cone faces in the direction from the working threads 4 of the hexagon screw 2". The angle of inclination is designated v. The herein described fastening device 1" works in the following way. The torque nut 3 has been screwed tight on the torque screw 9 by the manufacturer so firmly that a given defined torque is required to unscrew the torque nut 3 from the torque screw 9. Further, the torque member 3" is disengagably connected to the fastening screw 2" therein that the hexagon pin 23 is inserted into the hexagon socket 20 where it is secured with some power by means of a suitable adhesive between the hexagon pin 23 and the hexagon socket 20 or just through the friction between the said two elements. The securing force, however, is not greater than it can allow the torque member 3" to be disengaged from the hexagon screw 2" by hand or by means of a simple tool.

In operation, the fastening element 1" initially works as an integrated screw, which is screwed tightly by means of the working threads 4 in a not shown nut member, e.g. for clamping an object against the abutment surface 21. The screw operation is performed by means of a crescent spanner, an open ended spanner, a ring spanner, a monkey wrench, a grabber spanner, or the like, which grips around the torque nut 3. When the fastening screw 2" has "bottomed" with the stop surface 22 against the object (not shown), the fastening element 1" is turned further until the predetermined torque is reached and exceeded, whereupon the torque nut 3 comes off the torque screw 9. Because the threads 5, 6 of the torque nut 3 and the torque screw 9 are left-hand threaded, the torque nut 3, upon continued turning, will move upwards, i.e. away from the working threads 4 of the fastening screw 2". Thereafter the torque member 3" is disengaged from the fastening screw 2". When the fastening screw shall be loosened, and allen key is used in a conventional manner.

The substantial advantages with the device according to FIG. 5 is that the fastening member consists of a standardized fastening element, that the parts which are specially manufactured are restricted to the torque nut 3 and the torque screw 9, the designs of which are comparatively simple, which reduced the manufacturing costs, and that the torque member can be removed from the fastening member after use.

Figure 6:
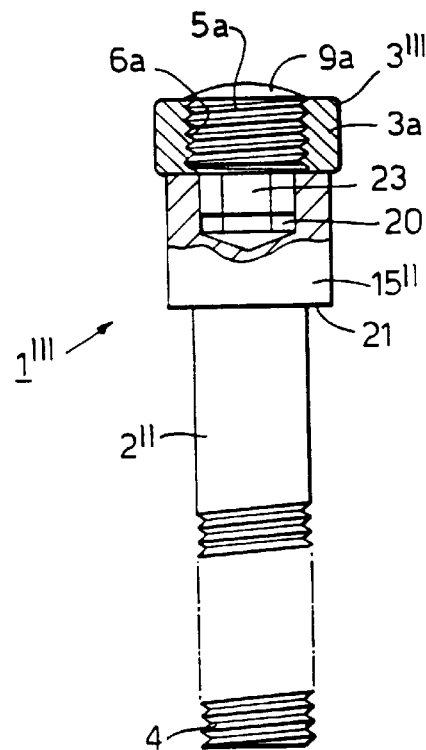
Figure 6A:
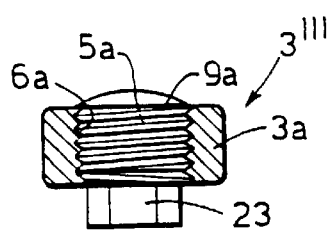

At the device according to FIG. 6, the fastening member as according to the just described device, consists of a standard type hexagon screw 2". The same reference numerals as in FIG. 5 have been used for the different details of the screw.

The torque member 3'" consists of a torque nut 3a and a torque screw 9a. The latter one is provided with a hexagon pin 23 which initially and during the use of the device is inserted into the hexagon socket 20 of the fastening screw 2". The torque nut 3a and the torque screw 9a have right-hand threaded threads 5a and 6a, respectively. When using the fastening element 1'", the torque member 3'" is united with the fastening screw 2". The fastening element 3'" in other words initially works as an integrated screw, as according to the previous embodiments, said screw being screwed tight by means of the working threads 4 in a nut member (not shown). The screwing is performed by means of a tool which grips around the torque nut 3a, the underside of which initially abuts the screw head 15". When the fastening screw 2" has "bottomed" with its abutment surface 21 against the not shown object, the fastening element 1'" is tightened further until the predetermined torque is reached, wherein the torque nut 3a is released from the torque screw 9a. Because the threads 5a and 6a of the torque member 3'" are right-hand threaded, the torque screw 9a herein is forced to move upwards relative to the torque nut 3a. This also can be expressed in such a way that the torque nut 3a is forced against the screw head 15". This has to the result that the hexagon pin 23 of the torque screw 9a is pulled up, out of the hexagon socket 20, so that the torque member 3'" automatically is released form the fastening screw 2".

When the fastening screw 2″ shall be unscrewed, an allen key or similar tool can be used as according to the previous embodiment.

I claim:

1. A torque-limiting fastening device, comprising a fastening member having first and second longitudinal ends, threading extending from the first end and a socket formed proximate the second end; and a torque member comprising a pin portion and a gripping member, the pin portion being adapted to be received within the socket formed at the second end of the fastening member so that the pin portion is longitudinally slidable, but non-rotational relative to the socket so as to allow torque to be transmitted from the pin portion to the fastening member, the gripping member being connected to the pin portion via a torque-transmitting threaded connection that transmits torque below a predetermined limit from the gripping member through the pin portion to the fastening member, and wherein the gripping member is arranged to be threaded relative to the pin portion when the torque exceeds the predetermined torque so as to cause the pin portion to slide longitudinally out of the socket.

2. The fastening device according to claim 1, wherein the torque-transmitting thread connection that transmits torque below a predetermined limit from the gripping member through the pin portion to the fastening member has conical threads.

3. The fastening device according to claim 2, wherein the gripping member is a torque nut cooperating with a torque screw formed integrally with the pin portion.

4. The fastening device according to claim 3, wherein the conical threads of the torque member are left-handed threaded.

5. The fastening device according to claim 3, wherein the conical threads of the torque member are right-handed threaded.

6. A threaded torque-limiting fastening device that includes a pin a socket connection comprising:

a fastening member having first and second longitudinal ends, a first sets of threads provided about an exterior of the fastening member and extending from the first longitudinal end of the fastening member, a first pin and socket connection component provided proximate the second longitudinal end of the fastening member, and a connector having a second pin and socket connection component and a threaded portion;

one of the first and second pin and socket connection component comprising a pin and the other of the first and second pin and socket connection components comprising a socket, the pin adapted to be received within the socket so that the pin portion is longitudinally slidable, but non-rotational relative to the socket so as to allow torque to be transmitted from the connector to the fastening member;

a gripping member that includes a surface adapted to be gripped and turned by a tool for applying torque to the gripping member; the gripping member including threads to allow the gripping member to be connected to the threaded portion of the connector via a torque-transmitting threaded connection that transmits torque below a predetermined limit from the gripping member through the connector to the fastening member, and wherein the gripping member is arranged to be threaded relative to the connector when the torque exceeds the predetermined torque and wherein the threading of the gripping member relative to the connector when the torque exceeds the predetermined torque causes the connector to slide longitudinally away from the fastening member.

7. Fastening device according to claim 6, wherein the torque-transmitting thread connection that transmits torque below a predetermined limit from the gripping member through the connector to the fastening member has conical threads.

8. Fastening device according to claim 7, wherein the gripping member is a torque nut cooperating with a torque screw formed integrally with the pin portion.

9. Fastening device according to claim 8, wherein the conical threads of the torque member are left-handed threaded.

10. Fastening device according to claim 8, wherein the conical threads of the torque member are right-handed threaded.

11. Fastening device according to claim 6, wherein the gripping member and connector are separate elements that can be threaded together.

12. Fastening device according to claim 6, wherein the first pin and socket connection component is a socket and the second pin and socket connection component is a pin portion, so that the connector includes a pin portion adapted to be received within the socket formed at the second end of the fastening member so that the pin portion is longitudinally slidable, but non-rotational relative to the socket so as to allow torque to be transmitted from the pin portion to the fastening member.

13. Fastening device according to claim 6, wherein the fastening member further comprising a flange portion provided thereon between the first set of threads and the first pin and socket connection component, the flange being constructed and arranged to act as a stop to limit axial movement of said fastening member.

14. A threaded torque-limiting fastening device comprising:

a fastening member having a first set of threads provided at least adjacent to a first end thereof, said fastening member having a screw head at a second end thereof opposite to the first end, said member head having a socket formed therein; and a torque member comprising a pin portion adapted to be received within the socket formed at the second end of the fastening member so that the pin portion is longitudinally slidable, but non-rotational relative to the socket so as to allow torque to be transmitted from the pin portion to the fastening member, the torque member further comprising a gripping member;

wherein the gripping member is connected to the pin portion via a torque-transmitting threaded connection that transmits torque below a predetermined limit from the gripping member through the pin portion to the fastening member, and wherein the gripping member is arranged to be threaded relative to the pin portion when the torque exceeds the predetermined torque and wherein the threading of the gripping member relative to the pin portion when the torque exceeds the predetermined torque causes the pin portion to slide longitudinally out of the socket.

15. Fastening device according to claim 14, wherein the torque-transmitting thread connection that transmits torque below a predetermined limit from the gripping member through the pin portion to the fastening member has conical threads.

16. Fastening device according to claim 15, wherein the gripping member is a torque nut cooperating with a torque screw formed integrally with the pin portion.

17. Fastening device according to claim 15, wherein the conical threads of the torque member are left-handed threaded.

18. Fastening device according to claim 15, wherein the conical threads of the torque member are right-handed threaded.

19. Fastening device according to claim 15, wherein said gripping member is provided with a portion constructed and arranged to receive a torque-applying tool.

20. Fastening device according to claim 14, wherein the socket is a hexagonal socket that can receive a torque-applying tool.

* * * * *